United States Patent [19]

Snyder

[11] 4,272,265
[45] Jun. 9, 1981

[54] APPARATUS FOR PRESSURE SWING GENERATION OF OXYGEN

[75] Inventor: Fred P. Snyder, St. Louis County, Mo.

[73] Assignee: Essex Cryogenics of Missouri, Inc., St. Louis, Mo.

[21] Appl. No.: 51,208

[22] Filed: Jun. 22, 1979

[51] Int. Cl.³ .................. F16K 11/02; B01D 53/06
[52] U.S. Cl. ........................... 55/389; 137/613; 137/625.21; 55/179; 55/161
[58] Field of Search .................. 210/142; 55/271, 389, 55/33, 58, 179, 161; 137/628, 613, 625.21, 870

[56] References Cited

U.S. PATENT DOCUMENTS

| | | | |
|---|---|---|---|
| 1,055,781 | 3/1913 | Mitchell et al. | 137/625.21 |
| 2,079,041 | 5/1937 | Ryan et al. | 137/625.21 |
| 2,235,287 | 3/1941 | Daniels | 210/142 |
| 3,948,286 | 4/1976 | Dunbar et al. | 137/625.21 |
| 4,194,890 | 3/1980 | McCombs et al. | 55/389 |
| 4,194,891 | 3/1980 | Earls et al. | 55/389 |

Primary Examiner—Ivars C. Cintins
Assistant Examiner—E. Rollins Cross
Attorney, Agent, or Firm—Kalish & Gilster

[57] ABSTRACT

Apparatus for generating oxygen by the pressure swing method includes a plurality of grouped vessels each having a molecular sieve bed, a first port of each vessel providing oxygen-enriched effluent from the bed and a second port permitting alternate pressurization and purging of the bed. A novel rotary control valve includes a housing around which the vessels are grouped, having an operating shaft driven by a constant speed rotor. First and second chambers within the housing spaced along the shaft have respective pressure and purge valve control rotors which are turned by the shaft. Pressurized air is provided to the first chamber by an air inlet, a purge gas outlet discharging purge gases from the second chamber. Passages extending between the chambers are spaced at equal intervals around the shaft axis and are respectively interconnected with the vessel second ports. Each of the rotors has a valve port adapted to communicate between the respective chamber and each of the passages in succession upon rotation of the rotors. A gas-tight seal is provided between these passages and opposed surfaces of the rotors. The valve ports are presented in angular relationship to one another and to said passages to cause pressurized air to be provided successively to the vessels while permitting purge gases to flow from the non-pressurized vessels. The vessels are sequentially pressurized and subsequently purged in cyclic manner as the shaft rotates.

7 Claims, 11 Drawing Figures

APPARATUS FOR PRESSURE SWING GENERATION OF OXYGEN

BACKGROUND AND SUMMARY OF THE INVENTION

This invention relates to apparatus for generation of oxygen and, more particularly, to a new system for generating an oxygen-enriched effluent by the pressure swing method.

An object of the present invention is the provision of a system for generating an oxygen-enriched gaseous fluid, or effluent, from a source of pressurized air.

A further object of the present invention is the provision of such a system for producing an oxygen-enriched effluent by use of the pressure swing method.

Another object of the present invention is the provision of such a system which utilizes molecular sieve beds and particularly which is capable of utilizing more than two such beds in separate vessels, for greater capability than has heretofore been achievable.

Another object of the invention is the provision of such a system for providing breathing oxygen particularly for aircraft use.

A further object of the invention is the provision of such a system including a rotary control valve for selectively supplying said molecular sieve beds with pressurized air while permitting purge gases to be concomitantly vented from others of said sieve beds to the atmosphere for the purpose of supplying from said beds an oxygen-enriched effluent.

Another object of the invention is the provision of such a system which is of extraordinary and economically simple construction, being created from a paucity of separate pieces and assemblies, having a minimum number of moving parts, and which is most economically and easily manufactured and assembled, as well as being long-lasting and easy to maintain.

Another object of the invention is the provision of such a system which does not necessitate the use of check valves for controlling flow of gases in and out of said system.

A further object is the provision of such a system having conduits which not only are directly routed, but also which are absolutely minimum length, conducing to extremely effective, high efficiency deliverance of gases between various different portions of the system.

Another object of the present invention is the provision of a rotary control valve of notably effective yet remarkably simple and efficient design.

A further object of the invention is the provision of such a rotary control valve which is extremely compact in design and conduces to the facile interconnection therewith of conduits through which the valve controls flow of fluids.

A still further object of the invention is the provision of such a control valve which permits direct routing of fluids through said valve.

Another object of the invention is the provision of such a control valve which, as utilized in an oxygen generating system including molecular sieve bed vessels, permits an efficient and compact, space-saving and lightweight arrangement of a plurality of such vessels and attendant components.

Other objects will be in part apparent and in part pointed out below.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
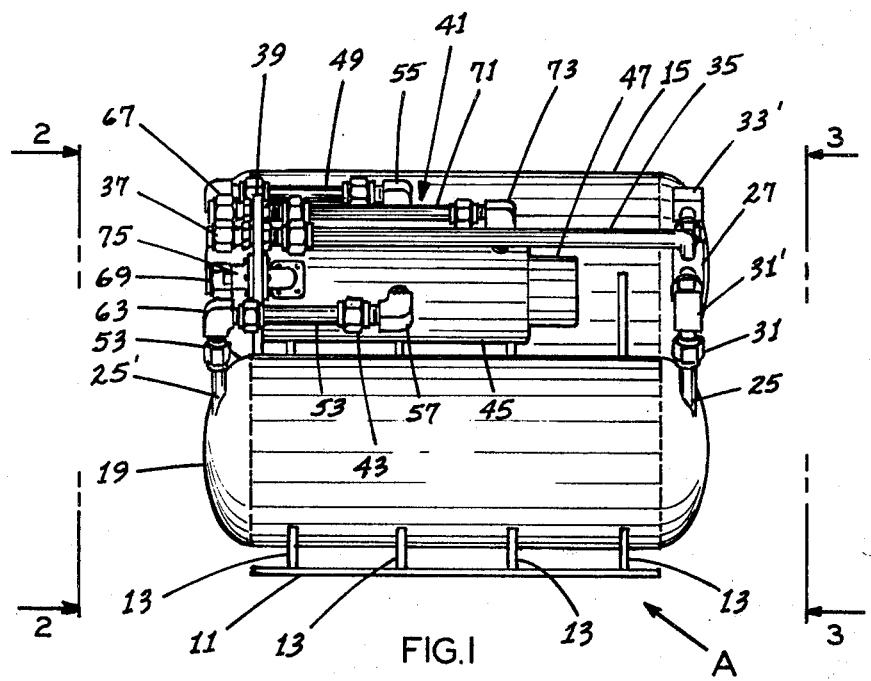
FIG. 1 is a side elevational view of a system generating an oxygen-enriched effluent which system is constructed in accordance with the present invention.
Figure 2:
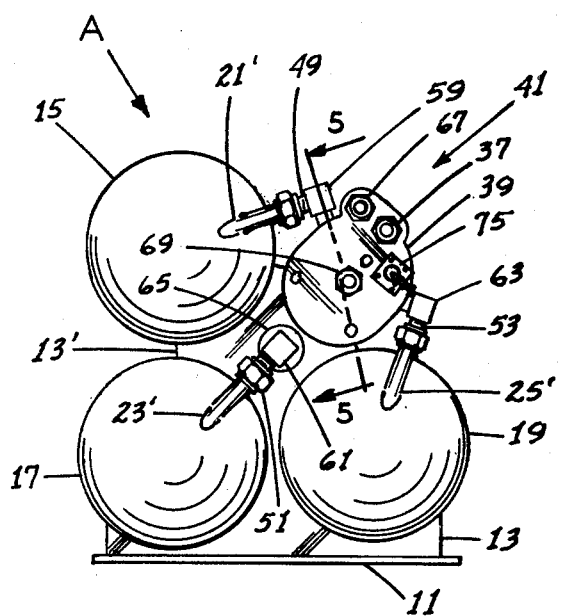
FIG. 2 is an end elevational view of the system of FIG. 1 as taken along line 2—2.
Figure 3:
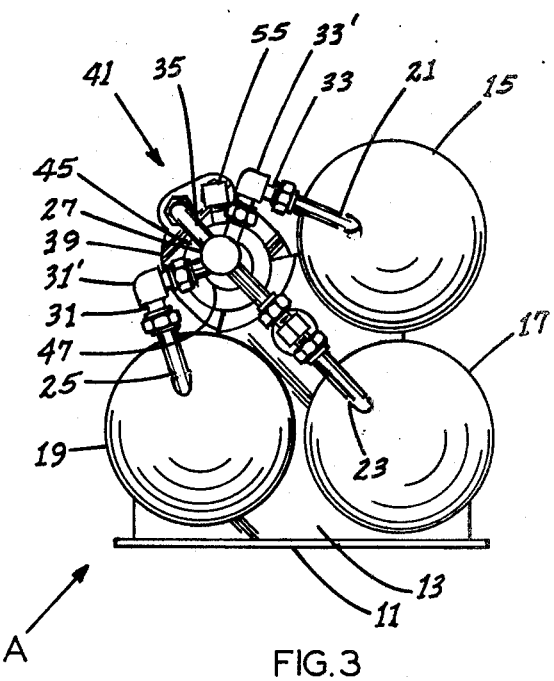
FIG. 3 is an opposite elevational view of the system of FIG. 1, as taken along line 3—3 of FIG. 1.

Referring now to FIGS. 1-3, a system of the invention is designated generally at reference character A, said system being adapted to generate oxygen-enriched effluent from a source of pressurized air, as drawn from the atmosphere, through use of the pressure swing method. System A is particularly well suited to the provision of oxygen-enriched breathing air as for use in aircraft operated at high altitudes where breathing oxygen is required.

As configured representatively in the drawings, system A includes a base plate 11 such as of strong lightweight alloy, there being a plurality of upstanding support plates welded to base plate 11 which are appropriately provided with curved recesses in which are fitted vessels in the form of three tanks 15, 17 and 19. Tanks 17 and 19 are each located proximate the upper surface of base plate 11, being positioned side by side and each having its longitudinal axis extending lengthwise of plate 11. The tanks are welded to the upright support plates 13. Each of said plates 13 is provided with an upper portion 13' having a recess conforming to the outer surface of tank 15 and welded thereto for supporting the latter above tank 17.

Each of tanks 15, 17 and 19 is of the type having a bed of molecular sieve material of the type suited for the fractionalization of air and the use of which is, for the purposes of the present system, made in accordance with the principles of the apparatus which is described in U.S. Pat. Nos. 2,944,627; 3,280,536; 3,142,547 and 3,948,286. Inasmuch as the use of such molecular sieve materials is thus known in the patent literature, it is not necessary to provide a description of such materials nor their use in tanks of the present type.

Each of tanks 15, 17 and 19 is provided at its opposite ends with a pair of ports, the same being respectively designated 21,21' for tank 15, at 23,23' for tank 17, and at 25,25' for tank 19. A first one of the two ports is adapted to provide an oxygen-enriched effluent from the molecular sieve bed (not shown) contained within the respective tank. Thus, tank 15 is provided with such an oxygen effluent port or outlet 21. The opposite or second port of each tank, e.g., port 21' of tank 15, is adapted for providing alternate pressurizing and purging of the molecular sieve bed.

Each of the tanks has its first or oxygen effluent port located at the same end as the corresponding port of the others of the tanks. Thus, ports 21, 23 and 25 are each visible in FIG. 3, wherein it may be seen that each of the ports 21, 23 and 25 are connected to a common manifold or chamber 27 by lengths of conduit, as indicated representatively at 29, 31 and 33 by elbow fittings 31' and 33' in said conduits 31, 33, respectively. A further conduit 35 extends from chamber 27 radially outwardly therefrom and thence forwardly along the lengths of the tanks and terminating at a connector fitting 37 at the opposite end of the apparatus. Said fitting 37 extends through a plate 39 carried proximate the end of the apparatus at the front of a rotary valve assembly designated generally at 41.

Valve assembly 41 comprises a rotary control valve 43 having a housing 45 at the rear of which is affixed a constant speed electric motor 47 of conventional design for causing continuous rotation of valve rotor within valve housing 45. The rotors are described in detail hereinbelow.

Figure 6:
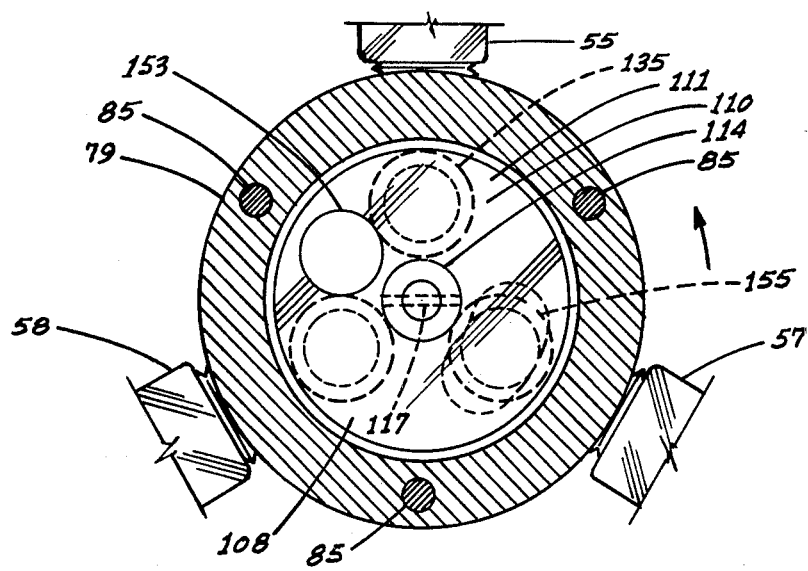
FIG. 6 is a transverse cross-sectional view of the control valve taken along line 6—6 of FIG. 5.
Figure 7:
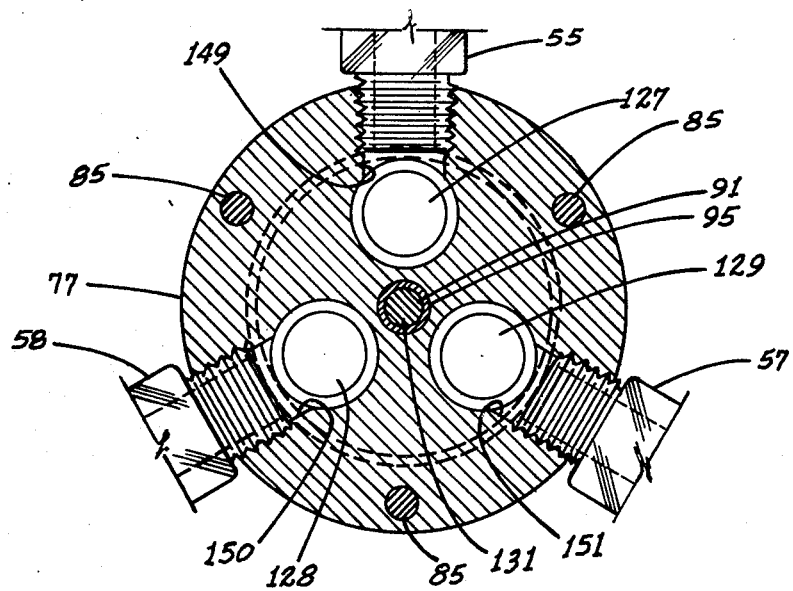
FIG. 7 is a similar cross-sectional view taken along line 7—7 of FIG. 6.

Each of the opposite end ports 21', 23' and 25' is interconnected by means of respective conduits 49,51 and 53 to the valve housing 45, as by means of elbow fittings shown at 55,57 in FIG. 1, a similar further elbow 58 being shown in FIGS. 6 and 7. For this purpose, each of the conduits includes also respective elbow fittings 59, 61 and 63 which permit the conduits to be directed back along the valve housing. The upper portion of the first support plate 13' is provided with an aperture 65 permitting conduit 51 to be routed rearwardly therethrough for connection to the valve housing 43.

At the front surface of plate 39, connector fittings 67,69 are provided for connection to the valve assembly 41 of external lines for receiving flow of purge gases and the flow of pressurized air, respectively. Fitting 67 is connected by means of conduit 71 which extends rearwardly along the surface of valve housing 43 and is connected thereto by means of an elbow fitting 73. Connection of electric power for electric motor 47 is facilitated by a cable connector 75 at the front surface of plate 39 where all of the requisite conduit connector fittings and electrical connections are conveniently presented at one end of the apparatus in a convenient grouping.

Valve assembly 41 is adapted upon energization of motor 47, to selectively supply air under pressure to each of the molecular sieve beds in tanks 15, 17 and 19, in succession, while permitting a purge fluid, i.e., purge gases, to be transmitted from others of the molecular sieve beds to the atmosphere while a continuous output of oxygen-enriched effluent is provided by conduit 35 and fitting 37 by virtue of common interconnection with ports 21, 23 and 25 of the respective tanks. The operative-enriched effluent may then be conveyed to further filtering apparatus for removal of nitrogen retaining therein, as desired.

Figure 4:
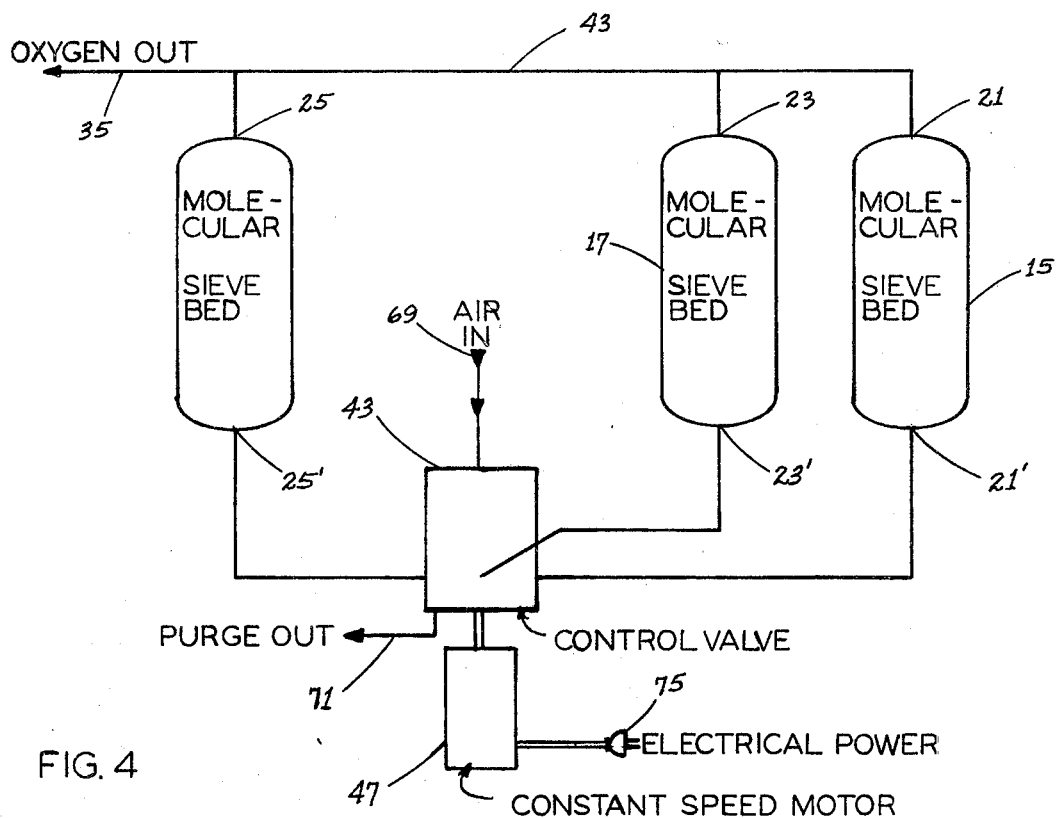
FIG. 4 is a schematic illustration of a system of FIG. 1, depicting the interconnection of various elements thereof, and including also a new rotary control valve of the invention.

Referring to FIG. 4, the schematic representation depicts each of the molecular sieve beds within their respective tanks 15, 17 and 19 with the manifold 43 providing a common interconnection with the first ports 21, 23 and 25 of the tanks and with each of the respective second ports 21', 23' and 25' being connected at valve housing 43. Air under pressure is provided to the valve housing by fitting 69, purge gases being communicated from the valve housing to atmosphere by conduit 71, all while motor 47 is operating at a constant speed.

Referring now to FIGS. 5-8, valve assembly 41 is illustrated in detail. Housing 43 is in the shape of a right cylinder having a cylindrical center section 77 and two cylindrical end sections 79 and 81 at the front and rear, respectively. Electric motor 47 is provided with a peripheral flange 83 which is butted against the surface of end section 81. The assembly is secured by cap screws 85 which are spaced at equal intervals around the periphery of the sections and extend through the entire length of each of the housing sections 77, 79 and 81 and are threaded into bores of motor flange 83, as illustrated representatively at 87. O-ring seals 89,89' are provided in suitable annular flanges in the opposite faces of center section 77 for providing a gas-tight sealing relationship against the corresponding opposed faces of the end sections 79, 81.

Journalled within the motor housing 43 and extending substantially the length of center section 77 and end section 81 is a shaft 91 which extends from motor 47 for being rotatably driven thereby. Said shaft 91 is journalled in sleeves 93,95 provided within a concentric bore 97 of center section 77. Bore 97 is provided with an annular boss 99 centrally positioned within the center housing for fixedly locating sleeves 93,95 within the center section, there being an O-ring 101 located adjacent the boss for providing a gas-tight sealing relationship about shaft 91. Similarly, a sleeve 103 is fitted within a bore 105 of end housing 81, there being an O-ring seal 106 at the rearward extremity of said sleeve 103 for providing a gas-tight seal about shaft 91 in the vicinity of motor 47, and said bore 105 having a shoulder 105' rearwardly of said seal for fixedly locating sleeve 103.

Figure 8:
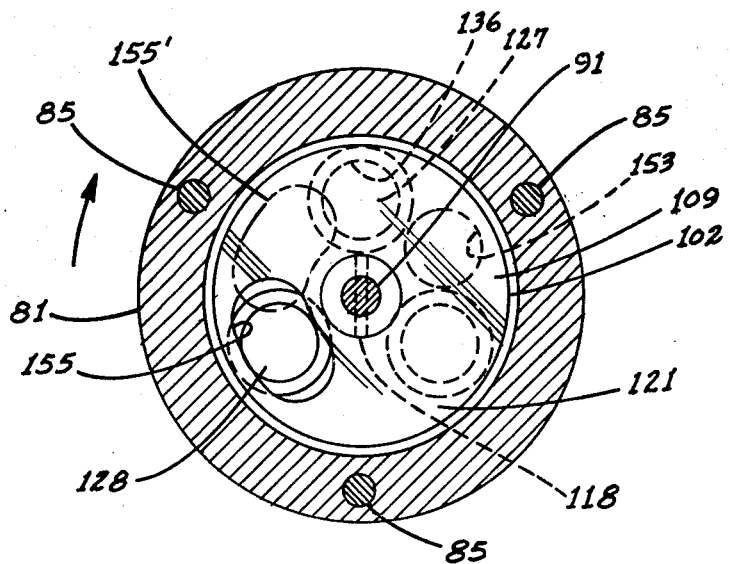
FIG. 8 is a further cross-sectional view similarly taken along line 8—8 of FIG. 5.

End sections 79,81 are provided with respective recesses 107,108, each of cylindrical shape to provide respective chambers 109,110 which are concentric with shaft 91, being of circular shape in plan (see FIGS. 6 and 8). Keyed to the shaft are valve rotors 111,112 located in the respective chambers 108,109 for providing valving functions therein upon rotation of shaft 91, being each provided with valving ports for this purpose as more fully explained below. However, it may be observed that each of the rotors include respective hubs 114,115 bored for receiving shaft 91 and pinned to the shaft as indicated at 117,118, respectively. Respective flanges 120,121 of disc configuration extend radially outwardly from each hub, having respective faces 124,125 for presenting opposed surfaces.

Extending lengthwise between chambers 108,109 are three passages 127, 128 and 129 constituted by circular bores spaced at equal 120° intervals around the axis 131 of rotation of shaft 91 and with each said bore or passage having its longitudinal center line at the same radial distance as the others from sahft axis 131.

Figure 5:
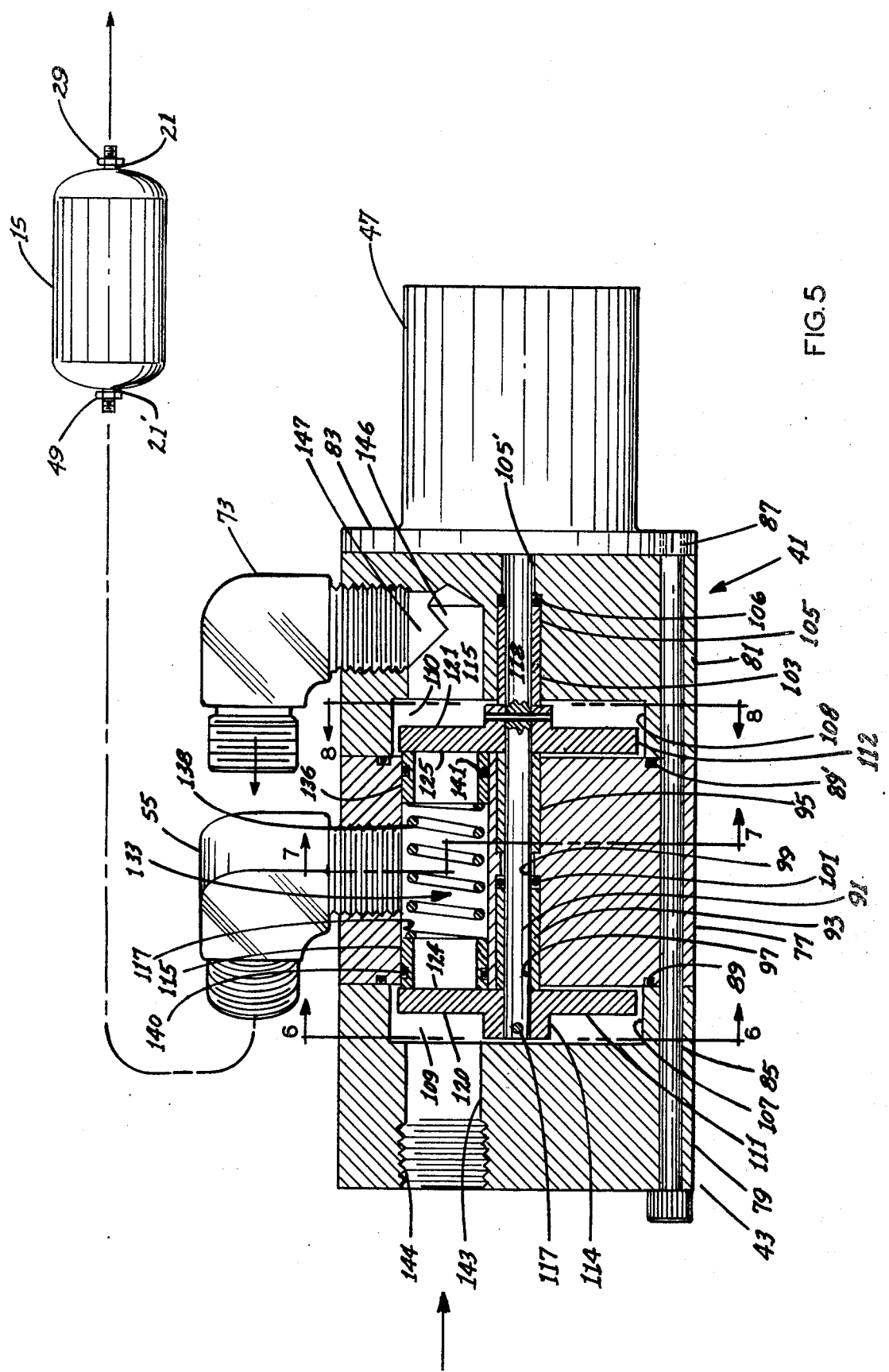
FIG. 5 is a longitudinal cross-sectional view of the new rotary control valve.

Fitted within each of said passages 127, 128 and 129 are identical seal assemblies, one being illustrated representatively at 133 in passage 127 in FIG. 5 and sufficing for showing corresponding structure in each of the other recesses 128,129. Assembly 133 comprises a pair of short circular sleeves 135,136, which are slidable within passage 127 and are biased apart by coiled compression spring 138 for bearing against the opposed faces 124,125, respectively, of the rotors for maintaining a sealing relationship therewith. Each of said sleeves 135,136 is provided with a respective O-ring 140,141 for providing a gas-tight sealing relationship with respect to the inner surface of bore 127 whereby a sealed communication is provided between the opposed faces of each of the valve rotors 111,112.

Opening into chamber 108 through the outer face of end section 79 is a bore 143 which is threaded as shown at 144 for receiving fitting 69 to supply air under pressure to chamber 108. In corresponding manner, a bore 146 is provided within end section 81 for communicating with chamber 109, there being a counter-bore 147 opening into bore 146 for having elbow fitting 73 whereby communication is provided between purge gas fitting 67 and chamber 109.

Similarly, radial bores 149, 150 and 151 are provided in the periphery of center section 77 for establishing communication with corresponding ones of passages 127, 128 and 129. Elbow fittings 55, 57 and 58 are threaded therein whereby communication is established between the second port of each of vessels 15, 17 and 19 and respective ones of passages 127, 128 and 129. One such vessel 15 is shown.

Referring to FIG. 6, the disc-like flanged portion 120 of rotor 111 is provided with a single circular port 153 which is adapted to be aligned with each of passages 127, 128 and 129 in succession upon rotation of shaft 91, the diameter of said port 153 being substantially identical with the inside diameter of sleeve 135, as well as the corresponding sleeves of the assemblies in each of the other passages 128,129.

Referring to FIG. 8, the peripheral portion 121 of rotor 112 is similarly provided with a single port 155 but having a cross-section which is elongated angularly about the axis of shaft 91 while having a radial dimension which is approximately the same as the inside diameter of sleeve 136 and each of its counterparts in passages 127, 128 and 129. Thus, upon rotation of rotor 112, port 155 will provide communication with each of said passages in succession for a proportionately greater period of time than will port 153. The relationship of said ports is demonstrated in FIGS. 6 and 8 wherein it should be observed that port 153 will be blocked by the surface 124 of rotor 111 when port 155 is substantially centered with respect to any one of passages 127, 128 and 129 but with the greater arcuate extent of port 155 permitting some overlap in the times and communication with respective ones of said passages by the two ports.

Ports 153,155 are, at times, diametrically opposed to one another, i.e., are 180° apart. Thus, at no time can both of said ports each be in communication with any given one of passages 127, 128 and 129 but each will provide communication with respective ones of said passages intermittently upon rotation of shaft 91. Port 153 may be termed herein a pressure control port since the same provides communication with the air pressure fitting 64 whereas port 155 may be termed a purge control port inasmuch as it controls the communication of the respective vessels with purge fitting 67. Similarly, rotor 111 may be termed the pressure control rotor and rotor 112, the purge control rotor.

The greater arcuate extent of the purge control port 155 will cause the respective ones of passages 127, 128 and 129 to be in communication with the purge fitting for a greater proportionately amount of time than the intermittent communication with respective ones of said passages provided by said pressure control port 153. Preferably, the arcuate or angular extent of purge control port 155 is sufficient to permit some degree of overlapping of the port with any two of passages 127, 128 and 129. Thus, in FIG. 8, the outline of said port 155 is shown in phantom at 155 to demonstrate the overlapping relationship of said purge control port providing concomitant, or simultaneous, communication with passages 127 and 128. In this way, purging of any corresponding two of the vessels 15, 17 and 19 may overlap as the rotors are turned by shaft 91.

As shaft 91 is rotated by motor 47, rotors 111,112 turn within their respective chambers 109,110 to sequentially provide communication between said chambers and each of passages 127, 128 and 129 so that pressurized air, which is supplied to chamber 109 through fitting 69, is first supplied to the respective passage and then said source of pressure is then effectively disconnected by the pressure control rotor 111 whereupon, through further rotation of the shaft, purge control rotor 121 subsequently provides communication between the respective chamber and the purge connection 67 which vents purge gases to the atmosphere. Such operation is sequentially depicted in FIGS. 9 and 10, as compared with FIG. 5. Since each of passages 127, 128 and 129 is of identical configuration, being merely located at equal 120° intervals around the axis of rotation of shaft 91, the operation of the rotors to provide such valving between the respective passages as illustrated by demonstrating operation solely with respect to passage 127.

Figure 9:
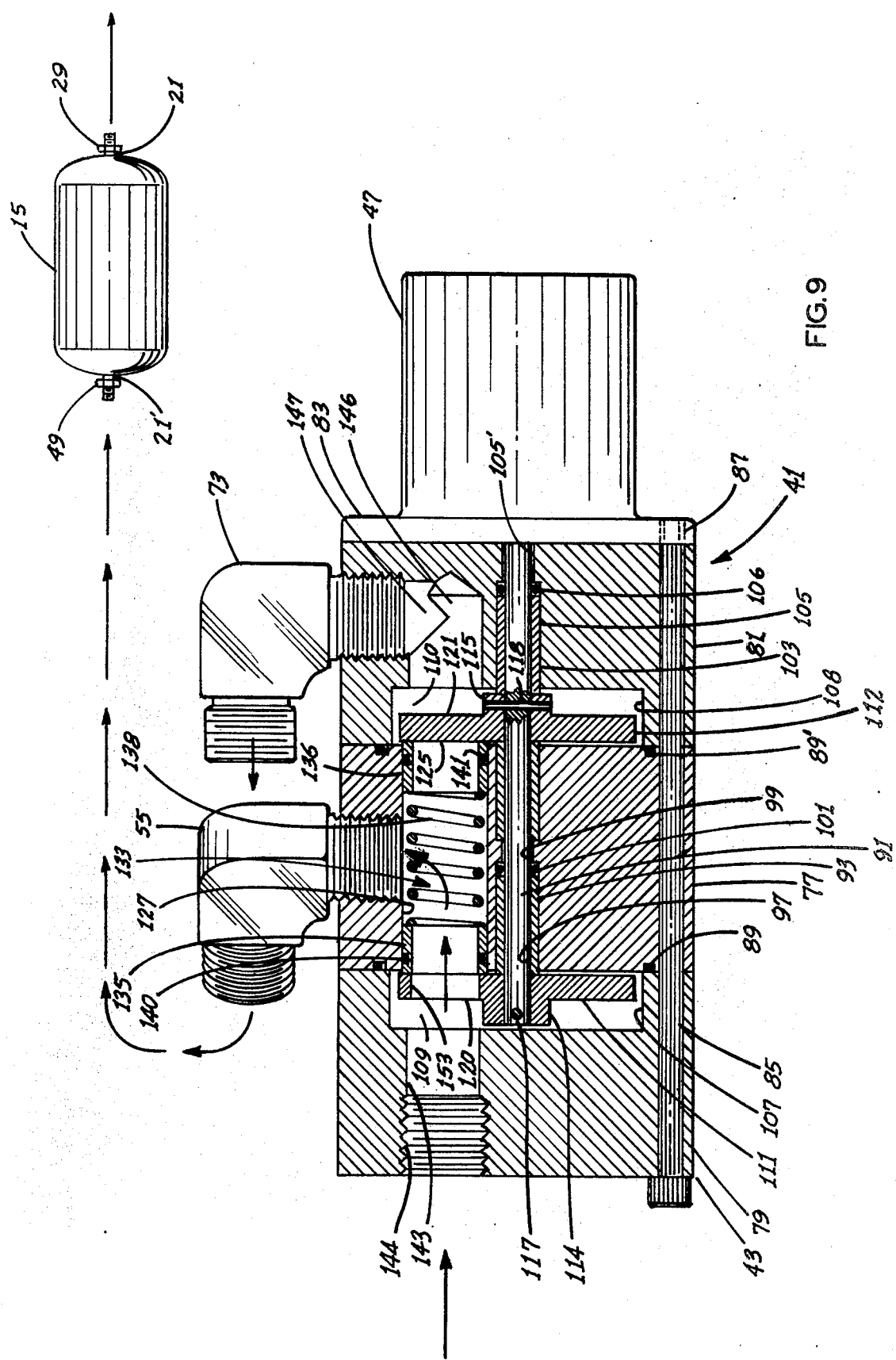
FIG. 9 is a longitudinal cross-sectional view similar to FIG. 5 but depicting the flow path of air under pressure when permitted to flow into a vessel of this system containing molecular sieve material.

Thus, referring to FIG. 9, pressurized air enters passage 143 and, therefore, is present in chamber 109. When rotor 111 turns so that port 153 is aligned with passage 127, pressurized air is permitted to flow into said passage and thence through elbow 55 to the port 21' at one end of tank 15. As has been eluded to previously, an oxygen-enriched effluent is provided by the opposite end port 21 of the vessel and, as long as the motor 47 continues to turn shaft 91 and to provide the valving functions contemplated herein, such effluent is continuously developed even though the air supply to such vessels is intermittent. As shaft 91 turns further, port 153 passes out of registry with passage 127 and ceases to communicate therewith. Passage 127 is then once more closed by the face 124 of rotor 111 as the latter turns. Further, the opposed face 125 of rotor 112 blocks the opposite end of passage 127. Such condition is illustrated in FIG. 5.

Figure 10:
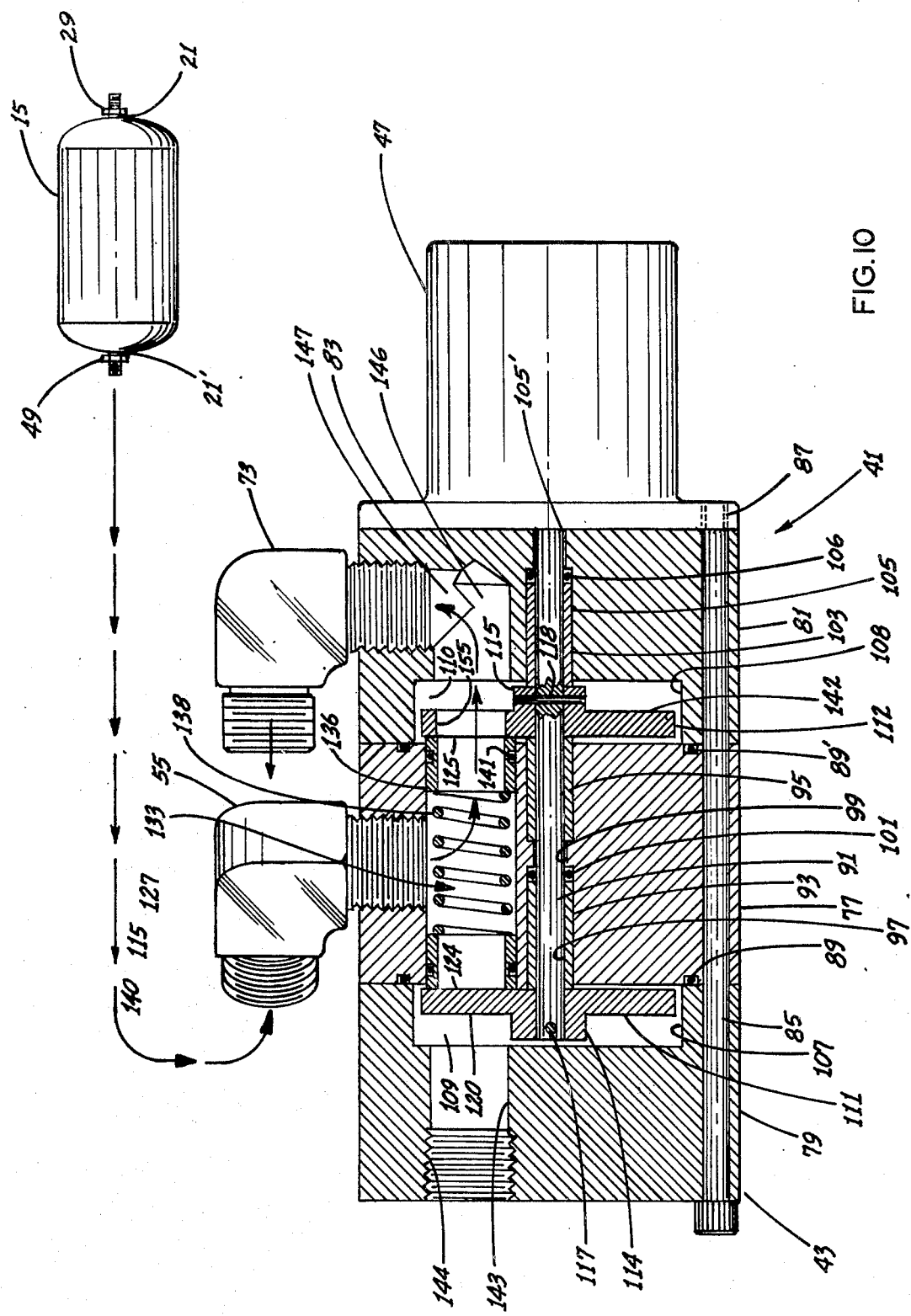
FIG. 10 is a longitudinal cross-sectional view similar to FIG. 9 but illustrating the flow path of purging gases when the rotary control valve provides communication between said vessels and the atmosphere.

Upon further rotation of shaft 91, port 155 in the purge control rotor 112 begins to uncover passage 127 and ultimately comes into exact alignment with passage 127, as illustrated in FIG. 10. Thereupon, purge gases will flow from port 21' due to the pressure already developed within vessel 15. The purge fluid may pass, as illustrated in FIG. 10, through elbow 55 and thence port 155, through chamber 110 in which rotors 112 turns, and thence via fitting 73 to be vented ultimately to the atmosphere. As the shaft continues to turn, port 155 will pass out of registry with, and move past, passage 127 whereupon face 125 of rotor 112 will once more block the rear end of passage 127, as illustrated in FIG. 5. Oxygen-enriched effluent continues to be provided by port 21 of vessel 15.

It will be understood that rotation of shaft 91 by motor 47 causes the pressure control rotor 111 to provide communication between chamber 109 and each of passages 127, 128 and 129 in sequence and with pressure being provided to the respective vessel interconnected with such passage for a period corresponding to the interval during which port 153 of rotor 111 provides communication between chamber 109 and the respective passage. Thus, pressurized air is provided to each of the vessels in sequence for predetermined periods.

Figure 11:
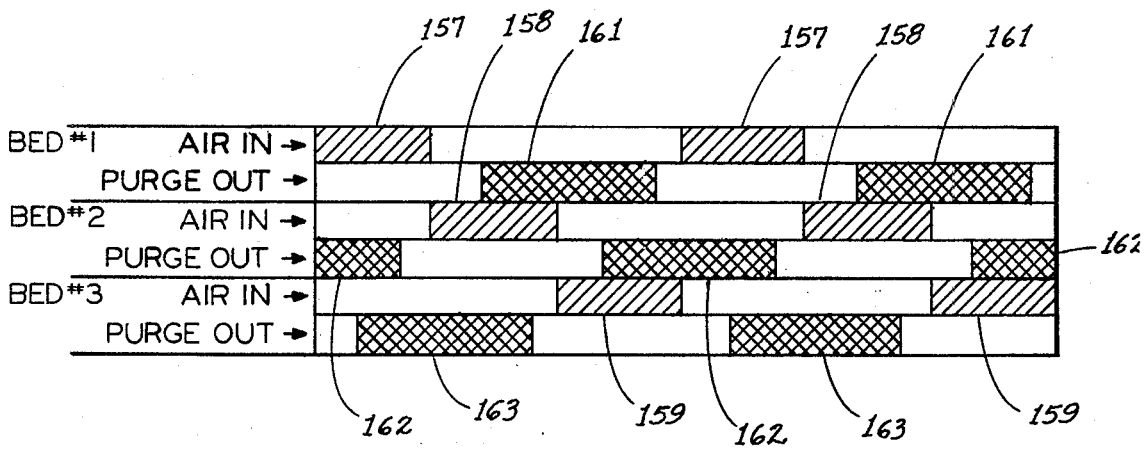
FIG. 11 is a chart depicting the timing and flow of gases within the system during successive cycles of rotation of valve elements of the control valve, in response to the operation of a constant speed motor of the system.

Referring to FIG. 11, a chart illustrates the sequential nature of the operation of the present apparatus. In the chart, legends identify three molecular sieve beds contained within vessels 15, 17 and 19. For each bed, a line is utilized to indicate the time during which port 153 of the pressure control rotor 111 permits pressurized air to flow into the bed. A second line indicates the time during which port 155 of the purge control rotor 112 permits purge gases to flow from the respective bed.

In the chart, reference numeral 157 indicates periods at which pressurized air may flow to vessel 15. Reference character 158 correspondingly indicates intervals during which pressurized air is supplied to the second bed, i.e., within vessel 17. Reference character 159 similarly indicates the interval during which pressurized air is supplied to a third bed within vessel 19. Preferably, the dimension of port 153 and diameter of passages 127, 128 and 129 are chosen so that when port 153 passes and thus ceases to provide communication with each such passage, it will begin to uncover the next passage so that pressurized air is immediately provided to the next passage in succession. Thus, it will be apparent in FIG. 11 that interval 158 immediately follows interval 157 and interval 159 immediately follows interval 158, such sequence again immediately repeating in cyclic manner.

Similarly, reference numerals 161, 162 and 163 are utilized to indicate the interval during which port 155 of the purge control rotor 112 provides communication with the respective molecular sieve bed in each of the vessels to permit the flow of purge gases therefrom. As will be apparent, no vessel may be both pressurized and purged at the same time but rather is first pressurized and thus subsequently purged with a small increment of time being permitted to elapse following pressurization before purging may occur. FIG. 11 illustrates such relationship wherein it will be apparent that the initiation of each purge interval 161 of the first bed follows the pressurization interval by small time delay corresponding to the period during which rotation of the purge control rotor occurs to bring port 155 into position for beginning to uncover the respective passage.

The relatively greater angular extent of port 155 in comparison with port 153 is seen to produce a proportionately longer interval of purging than pressurization. Thus, purge intervals 161 are each longer than pressurization intervals 157 for the first bed, and so forth. Also, the elongation or angular lengthening of port 155 permitting the port to simultaneously or concomitantly in any two of the passages is seen to produce an overlap in the purging relationship. Thus, each purge interval 161 overlaps purge interval 162 for the second bed. In turn, purge interval 162 overlaps the purge interval 163 for the third bed. In this way, the apparatus achieves an extremely efficient mode of operation in establishing appropriate pressurization and purge intervals for three molecular sieve beds, though the principles of the invention do not limit the system to three beds. The oxygen provides high volumetric flow of gases in the systems to achieve greater production of oxygen-enriched effluent yet entirely obviates complicated or expensive structure or circuitous, bulky plumbing while permitting gases to flow in a most direct and short route within the system.

The system as configured is extremely compact, has relatively few parts and is extremely advantageous for insulation in aircraft where space for the accommodation is very limited. However, the compact nature of the present system and efficacious arrangement of its few elements permits high output. Further, the extraordinary simplicity and small number of parts of the system conduce not only to high reliability and ease of maintenance but also to long life.

In view of the foregoing it will be seen that the various objects of the invention are achieved and various other advantageous results also are attained.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed and desired to be secured by Letters Patent is:

1. For use in a system for oxygen generation including a plurality of vessels each containing a molecular sieve bed and each having a first port for providing an oxygen-enriched effluent from the bed and a second port for alternate pressurizing and purging of the bed, rotary control valve apparatus comprising a valve housing, a shaft rotatably journalled in said housing and adapted for being driven for rotation, said housing providing first and second chambers spaced along the length of said shaft, respective pressure and purge control valve rotors carried by said shaft for rotation within the respective chambers, said valve housing including a pressurized air inlet communicating with said first chamber for admitting pressurized air thereto, and a purge gas outlet communicating with said second chamber for discharging of purge gases therefrom, said housing providing a plurality of passages extending between said chambers, said passages corresponding in number to said vessels and extending within said housing in lengthwise relationship between said first and second chambers, said passages being spaced at equal intervals around the axis of rotation of said shaft, said housing including a plurality of ports communicating with respective ones of said passages and adapted for being interconnected with respective second ports of said vessels, each of said rotors comprising a valve port adapted to provide communication between the respective chamber and each of said passages in succession upon rotation of said rotors by said shaft, said rotor valve ports being presented in angular relationship to one another and to said passages for causing pressurized air to be provided successively through at least one of said passages to a corresponding vessel while permitting purge gases to flow through at least one other of said passages from a corresponding vessel for first pressurizing and subsequently purging said vessels in cyclic manner upon rotation of said shaft, the valve port of said purge control valve rotor being of greater relative dimension than the valve port of said pressure control vave rotor to cause communication by said purge control valve rotor with respective ones of said passages for a proportionately greater time than said pressure control valve rotor port, said ports being positioned angularly relative to one another for permitting only one of said ports to be in communication with any given one of said passages, said purge control valve rotor port being of sufficient angular dimension for providing communication concomitantly with at least two of said passages whereby purging of a corresponding two of said vessels may overlap during a single revolution of said shaft.

2. Apparatus according to claim 1 and further comprising means for establishing a gas-tight sealing relationship of said passages with surfaces of said rotors for preventing communication through said passages at said surfaces except through valve ports of said rotors.

3. Apparatus according to claim 2, said rotors each comprising a disc, said discs having opposed surfaces contacted by said gas-tight sealing means, said passages extending between said surfaces, said gas-tight sealing means comprising sleeve means slidable in said passages and adapted to bear against said surfaces and means resiliently biasing said sleeve means against said surfaces.

4. Apparatus according to claim 1, said valve ports of said pressure and purge control valve rotors each having a radial dimension corresponding to a radial dimension of each of said passages, said purge control valve rotor port having an angular dimension substantially greater than the angular dimension of each of said passages.

5. Apparatus according to claim 4, said passages being three in number and spaced at 120° intervals around the axis of said shaft, said ports being positioned 180° apart for being diametrically opposed on opposite sides of said shaft.

6. Apparatus for oxygen generation comprising a plurality of vessels, each containing a molecular sieve bed and each having first and second ports, said first port being adapted to provide an oxygen-enriched effluent from said bed, said second port being adapted for providing alternate pressurizing and purging of said bed, a rotary control valve including a valve housing and an operating shaft journalled in said housing, a constant speed motor for driving said shaft at a constant angular velocity, said vessels being oriented with respect to said vessel housing for presenting the second port of each vessel proximate said valve housing, conduit means interconnecting the respective first ports of said vessels for providing a common oxygen-enriched effluent outlet, said housing comprising first and second chambers within said housing spaced along the length of said shaft, respective pressure and purge control valve rotors carried by said shaft for rotation within the respective chambers, said housing including a pressurized air inlet communicating with said first chamber for admitting pressurized air into and including a purge gas outlet communicating with said second chamber for discharging of purge gases therefrom, said housing further including a plurality of passages extending between said chambers, said passages corresponding in number to said vessels and being spaced at equal intervals around the axis of rotation of said shaft, said housing including a plurality of ports communicating with respective ones of said passages, conduit means interconnecting respective ones of the last-said ports with respective second ports of said vessels, each of said rotors being provided with at least one valve port adapted to provide communication between the respective chamber and each of said passages in succession upon rotation of said rotors by said shaft, means for establishing a gas-tight sealing relationship between said passages and surfaces of said rotors, said rotor valve ports being presented in angular relationship to one another and to said passages for causing pressurized air to be provided successively to said vessels through the respective second ports thereof while permitting purge gases to flow from at least one other of said vessels through the respective second port thereof, said valve port of said purge control valve rotor being of substantially greater angular extent than the valve port of said pressure control rotor whereby said purge control valve rotor port provides intermittent communication with respective ones of said passages of proportionately greater time than intermittent communication with respective ones of said passages provided by pressure valve rotor port, said purge control valve rotor port being of sufficient angular extent for providing communication concomitantly with at least two of said passages, whereby purging of a corresponding two of said vessels may overlap, whereby said vessels are first pressurized and subsequently purged in cyclic manner with respect to one another during each full revolution of said shaft.

7. Rotary control valve apparatus comprising a valve housing, a shaft rotatably journalled in said housing and adapted for being driven for rotation, first and second valve rotors each of disc form carried by said shaft for rotation within said housing, said valve housing including a fluid inlet communicating with said first rotor for providing fluid thereto, a fluid outlet communicating with said second rotor for receiving fluid therefrom, said housing haveing at least three separate passages extending between said rotors, said housing including a plurality of ports communicating with respective ones of said passages, each of said rotors comprising at least one valve port adapted to provide communication between the respective chamber and each of said passages in succession upon rotation of said rotors by said shaft, said rotor valve ports being presented in angular relationship to one another and to said passages for causing fluid to be provided successively through said passages to a corresponding one of said ports while permitting fluid from at least one other of said ports through a corresponding passage whereby fluid cyclically flows out of and subsequently back into said ports in succession upon rotation of said shaft, said rotors each having a face spaced from and oriented toward a corresponding face of the other rotor, said passages extending between said surfaces, and gas-tight sealing means for establishing a gas-tight sealing relationship of said passages with said faces for preventing communication through said passages at said faces except through valve ports of said rotors, said passages extending between said faces, said gas-tight sealing means comprising sleeve means slidable in said passages and adapted to bear against said faces and means resiliently biasing said sleeve means against said faces.

* * * * *